F. J. URION.
PACKING FOR SHAFT BEARINGS.
APPLICATION FILED FEB. 26, 1917.

1,248,040. Patented Nov. 27, 1917.

WITNESSES

INVENTOR
F. J. Urion
BY
ATTORNEYS

UNITED STATES PATENT OFFICE.

FRANK J. URION, OF FAIRMONT, MINNESOTA.

PACKING FOR SHAFT-BEARINGS.

1,248,040. Specification of Letters Patent. Patented Nov. 27, 1917.

Application filed February 26, 1917. Serial No. 150,953.

*To all whom it may concern:*

Be it known that I, FRANK J. URION, a citizen of the United States, and a resident of Fairmont, in the county of Martin and State of Minnesota, have invented a new and Improved Packing for Shaft-Bearings, of which the following is a full, clear, and exact description.

My invention relates to packing for bearings and is particularly adaptable for crank pits of internal-combustion engines where crank-pit compression is necessary.

An object of the invention is to provide a simple and efficient packing of the class described.

Reference is to be had to the accompanying drawings, forming part of this specification, in which like characters indicate corresponding parts in both views.

Figure 1:
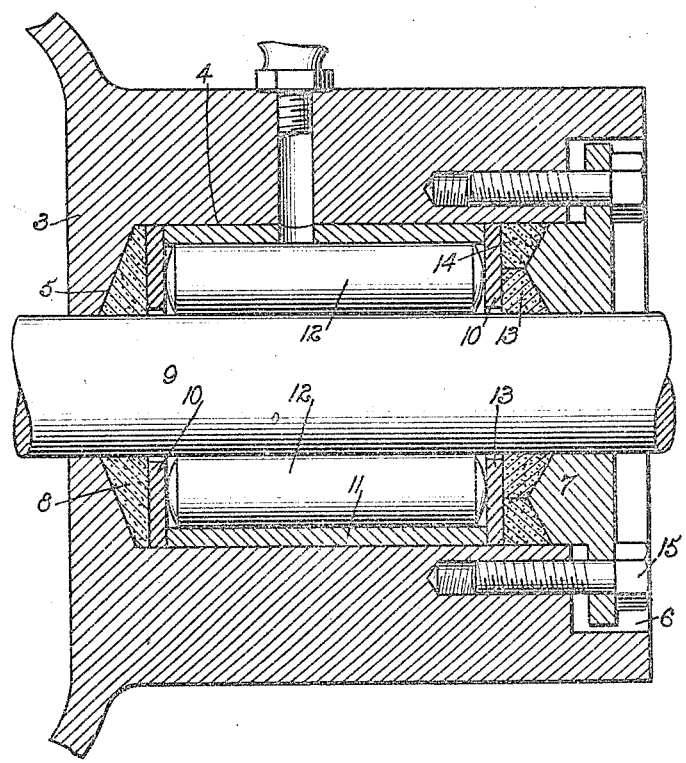
Figure 2:
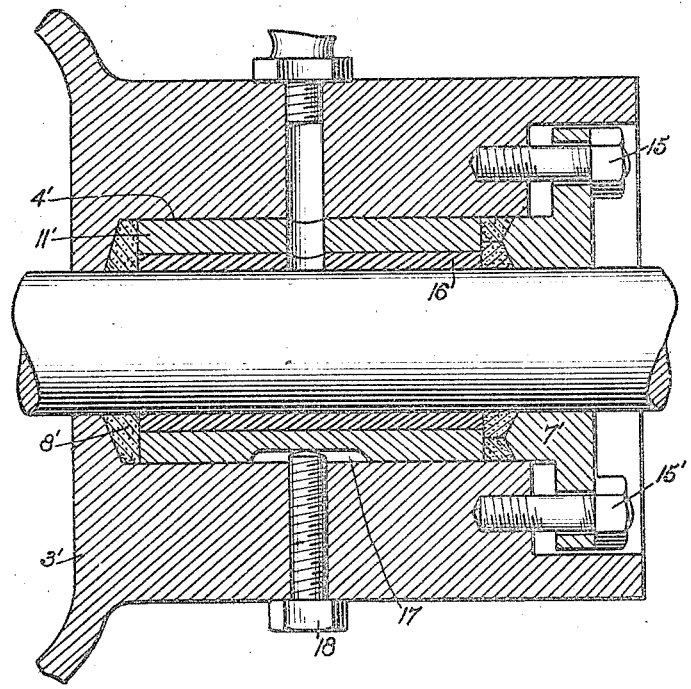

Figure 1 is an axial section through a crank-case roller bearing embodying my invention; and Fig. 2 is a similar section through a full surface bearing of a crank case.

Referring to the drawings, 3 is the bearing housing forming part of the crank case. It is provided with a recess 4 which terminates in a downwardly-tapering bottom or end 5 in proximity to the crank case. The recess 4 is enlarged at the open end, as shown at 6, to accommodate the flange of the packing gland 7. The recess 4 accommodates a packing ring having a tapering surface to fit snugly against the end 5 of the recess. The packing ring 8 fits snugly on the bearing of a shaft 9. Contacting with the packing ring 8 is a washer 10 which in turn contacts with the edge of a sleeve 11 fitted tightly into the recess 4, the fit being such that the sleeve can be driven into the recess by the screws 15 of the packing gland 7. Rollers 12 are provided between the bearing of the shaft 9 and the sleeve 11. Another washer 10 contacts with the other edge of the sleeve 11, and with the first mentioned sleeve it prevents a longitudinal movement of the rollers within the sleeve or roller race 11. Bearing against the outer washer 10 is a packing ring 13 of a diameter smaller than the race but having a running fit on the shaft 9. Said ring presents a bulging conical surface to the packing gland 7, for which surface said packing gland presents an inwardly, similarly-tapering conical surface. A packing ring 14 fits snugly over the packing ring 13 and into the recess 4 to contact with the adjacent washer 10. Said ring presents an inwardly-depressed conical surface the taper of which is preferably of an angularity similar to that of the packing ring 13 and with which it meets on a common circumference. In consequence, the two washers have a V-shaped channel formed therebetween. The packing gland 7 presents a similarly tapered surface to the packing ring 14. The packing gland 7 is secured to the bearing housing 3 by screws 15, the pressure to the gland being transmitted to the packing rings, thereby forming in the recess 4 air and oil-tight joints. By forming two packing rings 13 and 14 at the gland, a tight joint is provided at the shaft as well as at the end of the recess, the packing ring 8 forming a tight joint at the shaft at the other end of the recess.

In Fig. 2 the packing ring 8' contacts with a sleeve 11' which has a lining 16 of anti-friction material. The sleeve 11' so fits into the bore 4' that it can be moved against the packing ring 8' by means of the securing means 15' for the packing gland 7'. In the case of a full-surface bearing the sleeve 11' is provided with a notch or recess 17 to be engaged by a screw 18 carried by the housing 3'. The packing rings at the outer end of the bearing are in every respect similar to those described previously. It will be noted that in the structure of the full-face bearing there are no washers interposed between the end of the sleeve and the packing rings.

I claim:

1. In a packing for crank-case bearings, the combination of a bearing housing presenting a bore having an inner tapering end apertured for a shaft and an enlarged portion at the outer end of the bore to accommodate securing means for a packing gland, a packing ring fitting into the bore and having a tapering surface adapted to fit snugly against the tapering end of the bore, shaft-bearing means adapted to fit tightly into the bore to contact with the packing ring, a packing ring adapted to fit into the bore to contact with the shaft bearing means, said ring having a V-shaped circular groove on the outer end thereof, a packing gland presenting a surface fitting into the V-shaped groove, and means for securing the gland to the housing located in the enlarged portion of the bore, whereby pressure may be applied on the packing gland, substantially as and for the purpose set forth.

2. In a packing for crank-case bearings, the combination of a bearing housing presenting a bore having an inner tapering end apertured for a shaft and an enlarged portion at the outer end of the bore to accommodate the securing means for a packing gland, a packing ring adapted to fit into the bore and having a tapering surface for engaging the tapering end of the bore, shaft-bearing means adapted to fit tightly into the bore to contact with the packing ring, a packing ring formed of two concentric annular portions both adapted to contact with the bearing means, the outer annular portion fitting snugly into the bore, said two annular portions presenting a circular V-shaped groove, a packing gland presenting a surface fitting into the groove, and means for securing the gland to the housing located in the enlarged portion of the bore, whereby pressure may be applied on the packing gland.

3. In a packing for crank-case bearings, the combination of a bearing housing presenting a bore having an inner tapering end apertured for a shaft and an enlarged portion at the outer end of the bore to accommodate the securing means for a packing gland, a shaft in said bore, a packing ring fitting snugly on to the shaft and into the bore and having a tapering surface fitting snugly against the tapering end of the bore, bearing means for the shaft fitting tightly into the bore and contacting with the packing ring, a packing ring formed of two concentric annular portions both adapted to contact with the bearing means, the outer of the annular portions fitting snugly into the bore, the inner annular portion fitting snugly on to the shaft, the outer annular portion having an inwardly tapering surface, the inner annular portion having an outwardly tapering surface whereby the two annular portions form a circular V-shaped groove on the outer faces, a packing gland engaging the bore and presenting an end surface fitting into the V-shaped groove, and means for securing the gland to the housing located in the enlarged portion of the bore whereby pressure may be applied to the packing gland.

FRANK J. URION.